Patented Nov. 7, 1950

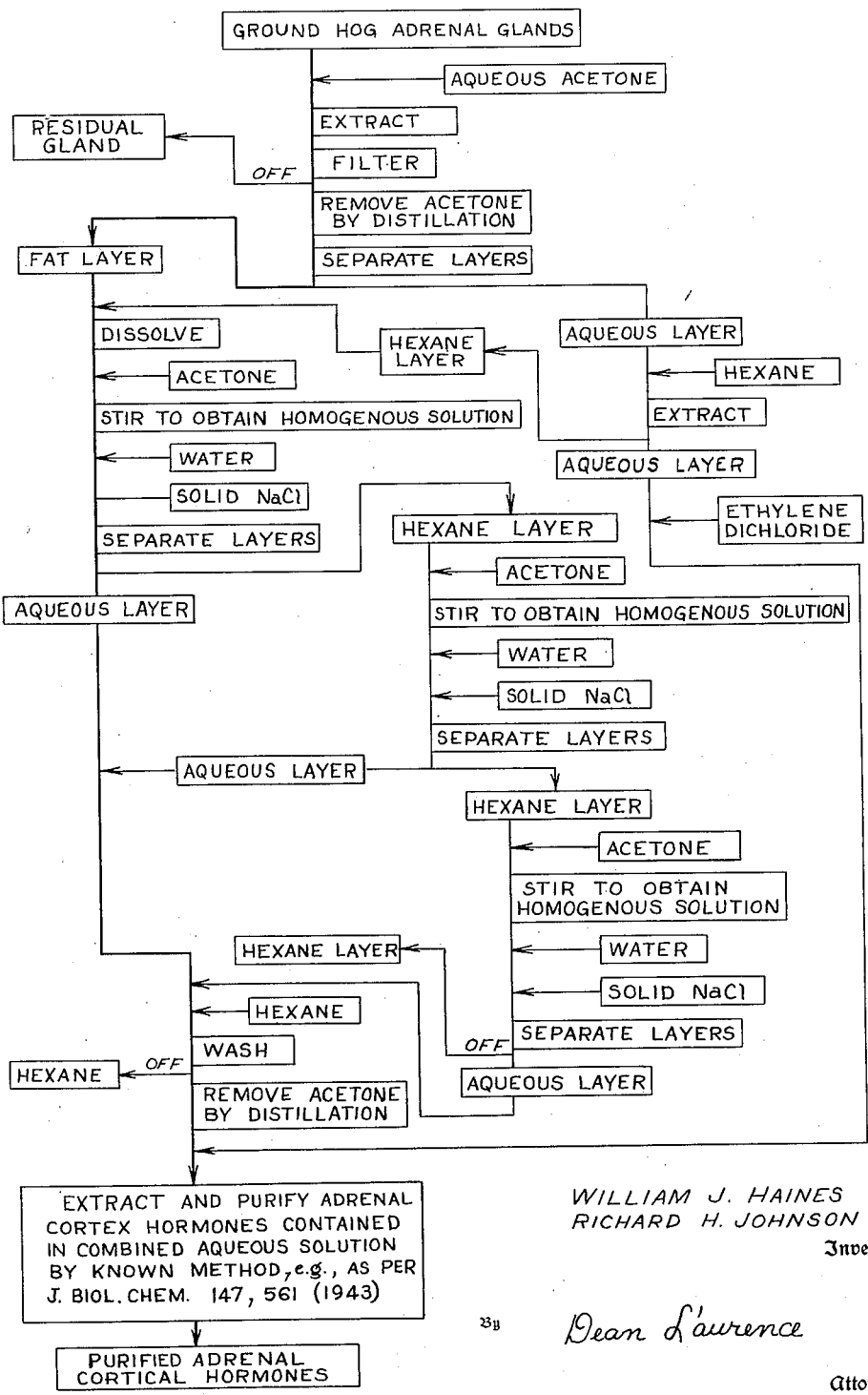

2,528,880

UNITED STATES PATENT OFFICE 2,528,880

EXTRACTION OF ADRENAL GLANDS

William J. Haines and Richard H. Johnson, Kalamazoo, Mich., assignors to The Upjohn Company, Kalamazoo, Mich., a corporation of Michigan Application August 6, 1947, Serial No. 766,884

20 Claims. (Cl. 167—77)

The present invention relates to a method for obtaining adrenal cortex hormones from fat ordinarily intimately associated with a mammalian adrenal gland, and is more particularly concerned with a method for releasing adrenal cortex hormones from fat which separates in the process of extracting mammalian adrenal glands.

The therapeutic utility of adrenal cortex hormones is now so widely accepted by the medical profession that the total supply of mammalian adrenal glands necessary for the production of these hormones has become a limiting factor in the amount of adrenal cortex hormones available for such use. Since the adrenal gland represents but a small part of the total body weight of the animal, and is accordingly a by-product, rather than a prime factor, in the determination of the animal population or the number of animals to be slaughtered commercially, the demand for adrenal glands unfortunately cannot stimulate the supply of animals from which they are obtained. The users of adrenal cortex hormones have no method at their disposal by which to increase the supply of adrenal glands as such.

It is accordingly an object of the present invention to increase the amount of adrenal cortex hormones obtainable from a given quantity of mammalian adrenal glands and thus, in effect, to increase the available supply of adrenal glands. Another object of the invention is to provide a more efficient method for the isolation of crude adrenal cortex hormones from extracts of adrenal glands. A further object of the invention is to provide a method for the extraction of adrenal cortex hormones from the fat ordinarily intimately associated with the gland. An additional object of the invention is the provision of an improved process for the extraction of adrenal cortex hormones from pretreated adrenal glands. Other objects of the invention will become apparent hereinafter.

This invention thus consists of a method whereby greater quantities of hormone can be extracted from adrenal glands than can be obtained from the same quantity of adrenal glands by the best known methods of solvent extraction, of which those shown in The Journal of Biological Chemistry 116, 57 (1936) and 147, 561 (1943) are representative. When the total amount of adrenal cortex hormones available from a given amount of glands according to the present and previous processes is compared, the quantity obtained by the method of the present invention is greater by about 60 per cent. This significant increase in recoverable adrenal cortex hormones which, in effect, increases the supply of available adrenal glands by a like amount, should make the process readily acceptable to the pharmaceutical industry.

According to conventional procedure, wherein ground adrenal glands are extracted with an aqueous organic solvent, e. g., acetone, and the water layer containing dissolved hormones is isolated, there remains, besides the organic solvent which has been removed from the aqueous layer, a fat layer. The presence of a fat layer in the extract after removal of the solvent cannot be obviated by removal of the external fat associated with the gland of commerce. The fat, external to the anatomical entity, the adrenal gland, varies in amount with the skill of the operator in removing the gland from the slaughtered animal and the species of animal, being greatest in the hog. While the external fat may be removed by skillful dissection, fat still remains of the intact gland. This internal fat is so intimately associated with the gland structure that it is impossible to separate it by any known mechanical procedure. The presence or absence of external fat in any quantity of adrenal glands being treated is therefore not controlling as to the operativeness of the new process, since some fat, especially the internal fat, is always present and the amount of the hormone available from this internal fat alone is sufficient to be of economic importance.

In carrying out the process of the invention, the fat layer may first be obtained by the practice of any known method for the extraction of adrenal cortex hormones from the adrenal gland. Where the ground adrenal gland is pretreated, the method of pretreatment may be as described in the copending application of Kuizenga and Haines, Serial No. 690,074, filed Aug 12, 1946. After removal of all or part of the organic solvent, the fat layer which forms is separated from the water layer. The water layer, which contains some suspended fat, is agitated with a suitable fat solvent, e. g., hexane. The solvent layer is then withdrawn and the main fat layer dissolved therein. The water layer, after the addition of ethylene dichloride, is set aside to be processed further.

A suitable fat solvent for use as above-described is a non-polar organic compound which is only slightly soluble in water, and in which the fat is highly soluble while the adrenal cortex hormones are relatively difficultly soluble. Aliphatic and cycloaliphatic hydrocarbons possess the necessary qualifications, and those containing from 5 to 8 carbon atoms and boiling between about 30 and 130 degrees centigrade are preferable. An especially preferred fat solvent is a mixture of aliphatic hydrocarbons boiling between about 60 and 90 degrees centigrade, comprising essentially a hexane fraction. This fraction will be hereinafter referred to as hexane. Other suitable fat solvents are pentane, heptane, octane, and cyclohexane.

The extraction of the hormone from the fat solution is then accomplished by the use of an aqueous water-soluble ketone or water-soluble alcohol. The fat, the fat solvent, and the adrenal cortex hormones are all soluble in the water-soluble ketone, and, upon addition of water, the hormone goes into the ketone-water layer. Neutral, polar organic solvents, such as low molecular weight water-soluble ketones, of which acetone, methyl-ethyl ketone, and diethyl ketone are representative, and low molecular weight alcohols such as methanol, ethanol, propanol and isopropanol, may also be employed. These solvents are advantageously diluted with water, either prior to the extraction of the fat solution, or by the addition of water to the fat-fat solvent-ketone or alcohol-hormone solution. When less than about 40 per cent of water is present in the aqueous-ketone layer, an inconvenient amount of fat is usually extracted along with the adrenal cortex hormones. When the aqueous-ketone layer contains more than about 80 per cent of water, troublesome emulsions are frequently encountered and the hormones are less soluble in the solvent mixture. The aqueous water-soluble ketone layer, containing the hormone which separates, ordinarily should contain between about 20 and 60 per cent by volume of the ketone, preferably 30 to 50 per cent, and about 40 per cent is considered optimum. Solid salt (sodium chloride), an acid, or any other satisfactory agent may be added to assist in the breaking or prevention of emulsions.

After separation from fat solution, the aqueous ketone solution of the adrenal cortex hormones may be washed with an additional quantity of fat solvent to remove the last traces of fat. The ketone is thereafter removed, preferably by distillation in vacuo. The residual water solution of adrenal cortex hormones may then be added to the water solution from which the fat was originally separated, and the combined solutions further extracted and purified by known methods. If desired, the two aqueous hormone solutions may be treated further separately for extraction and purification purposes. If not combined, but extracted and purified separately, the fat layer furnishes about 37 per cent and the water layer about 63 per cent of the total hormones obtained.

For a determination of the quantity of active adrenal cortex hormones present in the final product, any suitable method may be used, the work assay method of Ingle, Endocrinology 26, 472 (1940) being the one to which reference is made in the examples.

The method of the invention may be applied with equal facility to the treatment of any mammalian adrenal glands, such as beef, sheep, and hog, with the hog adrenal glands being more readily available and of a higher hormone content, and therefore somewhat more readily adapted to the process. The adrenal glands before entering the process may be subjected to a pretreatment, as according to the method disclosed in the previously-identified application, or the gland may be introduced directly into the process without any prior treatment whatsoever. For optimum results, however, it is desirable to employ pretreated adrenal glands, and the examples describe the invention in this preferred form.

Reference is made to the accompanying drawing, which is a flow sheet illustrating the flow of materials in the process of the present invention, in an embodiment thereof corresponding substantially to Example 1B herein. According to the flow sheet, ground hog adrenals are extracted with aqueous acetone, superfluous or residual gland removed by filtration, and the filtrate then treated as disclosed in Example 1B. The filtrate is distilled in vacuo to remove the acetone, and the aqueous mixture separated into a fat layer and an aqueous layer. The aqueous layer is separated, extracted with hexane, the aqueous layer separated, and, after addition of ethylene dichloride, a preservative, set aside. The hexane used to extract the aqueous layer is then used to dissolve the fat layer. Acetone is then added to the hexane-fat solution, the mixture stirred until homogeneous, whereafter water and solid sodium chloride are added. Two layers form, whereafter the hexane layer is separated from the aqueous layer and extracted twice more in a similar manner with aqueous acetone, the fat-hexane-acetone mixture in each case being stirred until homogeneous, whereafter water is added thereto. The hexane layer, after three extractions, is discarded, while the aqueous acetone layers from the three extractions are combined, washed with hexane, and the hexane layer then discarded. The combined aqueous acetone layers are then distilled to remove the acetone, and the aqueous acetone solution combined with that previously set aside. The adrenal cortex hormones present in the combined solutions are then further extracted and purified by known methods, of which the method given in the Journal of Biological Chemistry 147, 561 (1943), is representative. The result of the employment of the invention, as shown in the flow sheet, is the production of 128 units of active material per kilogram of gland, as determined by the Ingle Work Test, as contrasted with 72.5 units of active material per kilogram which is produced by extraction and purification processes not employing the method of the present invention, as illustrated by comparative Examples 1A and 1B.

The following examples are given only to illustrate the practice of our invention, and are not to be construed as limiting.

Example 1

Eight kilograms of hog adrenal glands were pretreated according to the method of application Serial 690,074 and extracted for six days with 75 per cent acetone. Superfluous gland was removed by filtration and the filtrate then divided into two equal portions, the first of which was treated by conventional procedure as described in Example 1A, and the second of which was treated by the method of the present invention as described in Example 1B.

Example 1A

One-half of the above filtrate was diluted with water until a 60 per cent acetone concentration was obtained. Two layers formed, a liquid fat layer and a 60 per cent acetone layer. These layers were separated and the acetone-water layer was distilled in vacuo to remove the acetone. The fat layer which separated from this operation solidified upon cooling to room temperature. The solid fat was separated and washed once with water, the wash water being added to the aqueous solution from which the fat had separated. Sufficient acetone was added to give a 20 per cent aqueous acetone solution, which was set aside for further purification.

The liquid fat layer was washed twice by gentle stirring with 20 per cent acetone. These 20 per cent acetone washings were combined with the main 20 per cent acetone fraction.

The combined 20 per cent acetone solutions were washed twice with hexane to remove suspended fat. The hexane washes were combined and washed twice with 20 per cent acetone, after which the hexane was discarded. The hexane-washed 20 per cent acetone solution was distilled in vacuo to remove the acetone, whereupon the water solution was further extracted and purified by known methods (Journal of Biological Chemistry 147, 561 (1943)). There was obtained 72.5 units of active material per kilogram of gland as determined by the Ingle work test.

Example 1B

The second half of the above filtrate was distilled in vacuo to remove the acetone. Upon standing for about an hour, the mixture separated into a fat layer and an aqueous layer. The aqueous layer was separated, extracted with three liters of hexane, then separated and, after addition of ethylene dichloride, was set aside. The fat layer was dissolved in the hexane, which was recovered from the extraction of the aqueous layer. About 1000 milliliters of acetone was added to the hexane solution, the mixture stirred until homogeneous, and 3.0 liters of water and 4 grams of solid sodium chloride was added with gentle stirring. Two layers formed, after which the hexane layer was separated from the aqueous layer and extracted twice more in a similar manner with 600 milliliters of acetone and 2400 milliliters of water for each extraction. The hexane layer was discarded, while the aqueous acetone layers were combined, washed once with hexane, and the hexane layer then discarded. After distillation of the combined aqueous acetone layers to remove the acetone, the aqueous solution was combined with that previously set aside. The combined solutions were then further extracted and purified by known methods to which reference has already been made. There was obtained 128 units of active material per kilogram of gland as determined by the work test.

Example 2A

Four kilograms of pretreated hog adrenal glands were extracted for six days with 75 per cent acetone. Superfluous adrenal gland was removed by filtration and the acetone removed from the filtrate by distillation in vacuo.

The fat layer which separated was dissolved in 2 liters of acetone, and the still washed with an additional liter of acetone. Sufficient water was added to the fat-acetone solution to reduce the concentration of acetone to 60 per cent, then 1 gram of NaCl per liter of aqueous-acetone was added. Two layers formed, whereafter the fat layer was removed and dissolved in 400 milliliters of acetone. Solid salt and water as above was added in an amount sufficient to reduce the acetone concentration to 20 per cent, after which the fat layer was again separated and treated in a like manner. The aqueous acetone solutions were combined and added to the main aqueous solution from which the fat had first been separated. These combined solutions were made up to 20 per cent acetone and washed twice with hexane. The hexane solution was washed twice with 20 per cent acetone, the acetone solution being added to the main fraction. The combined acetone-water solutions were distilled in vacuo to remove the acetone, and the aqueous residue extracted with ethylene dichloride and purified by known methods. There was obtained 72.5 units of active material per kilogram of gland as shown by the work test.

Example 2B

Four kilograms of hog adrenal glands from the same lot as in Example 2A were pretreated and extracted with 75 per cent acetone and the acetone removed from the filtrate in the same manner as described in Example 2A.

The fat which separated was dissolved in 4 liters of commercial hexane and shaken with 4 liters of 20 per cent acetone solution and 4 grams of solid sodium chloride. The fat and hexane separated upon standing. The same procedure was then repeated twice more, whereupon the fat-hexane solution was discarded. The acetone solution was extracted once with the hexane, after which the acetone was removed by distillation in vacuo. The aqueous residue was added to that previously obtained, and the combined solution extracted with ethylene dichloride and purified by known methods. There was obtained 120 units of active material per kilogram of gland as shown by the work test.

Example 3

Twelve kilograms of hog adrenal glands were pretreated according to the method of application Serial 690,074 and extracted for six days with 75 per cent acetone. The spent gland was removed by filtration and the filtrate then divided into three equal portions, the first of which was treated by the procedure as described in Example 3A, the second of which was treated by the method described in Example 3B, and the third portion treated by the procedure described in Example 3C.

Example 3A

One-third of the above filtrate was distilled in vacuo to remove the acetone. Upon standing for about an hour, the mixture separated into a fat layer and an aqueous layer. The aqueous layer was separated, extracted with four liters of hexane, then separated and after the addition of ethylene dichloride was set aside. The fat layer was dissolved in the four liters of hexane, which was recovered from the extraction of the aqueous layer. About 1000 milliliters of acetone was added to the hexane solution, the mixture stirred until homogeneous, and three liters of water and four grams of solid sodium chloride was added with gentle stirring. Two layers formed, after which the hexane layer was separated from the aqueous layer and extracted twice more in a similar manner with 800 milliliters of acetone, 3200 milliliters of water and two grams of solid sodium chloride. The hexane layer was discarded, while the aqueous acetone layers were combined, washed once with hexane, and the hexane layer then discarded. After distillation of the combined aqueous acetone layers to remove the acetone, the aqueous solution was combined with that previously set aside. The combined solutions were then further extracted and purified by known methods to which reference has already been made. There was obtained 87 units of active material per kilogram of gland as determined by the work test.

*Example 3B*

The second third of the above filtrate was distilled in vacuo to remove the acetone. Upon standing for about an hour, the mixture separated into a fat layer and an aqueous layer. The aqueous layer was separated, extracted with three liters of hexane, separated and, after addition of ethylene dichloride, set aside. The fat layer was dissolved in the hexane, which was recovered from the extraction of the aqueous layer. About 1400 milliliters of acetone was added to the hexane solution, the mixture stirred until homogeneous, and 2600 milliliters of water and four grams of solid sodium chloride was added with gentle stirring. Two layers formed, after which the hexane layer was separated from the aqueous layer and extracted twice more in a similar manner with 1400 milliliters of acetone, 3200 milliliters of water and two grams of solid sodium chloride for each extraction. The hexane layer was discarded, while the aqueous acetone layers were combined, washed once with hexane, and the hexane layer then discarded. After distillation of the combined aqueous acetone layers to remove the acetone, the aqueous solution was combined with that previously set aside. The combined solutions were then further extracted and purified by known methods to which reference has already been made. There was obtained 116 units of active material per kilogram of gland as determined by the work test.

*Example 3C*

The last third of the above filtrate was distilled in vacuo to remove the acetone. Upon standing for about an hour, the mixture separated into a fat layer and an aqueous layer. The aqueous layer was separated, extracted with three liters of hexane, then separated and, after addition of ethylene dichloride, set aside. The fat layer was dissolved in the hexane, which was recovered from the extraction of the aqueous layer. About 1800 milliliters of acetone was added to the hexane solution, the mixture stirred until homogeneous, and 2200 milliliters of water and four grams of solid sodium chloride was added with gentle stirring. Two layers formed, after which the hexane layer was separated from the aqueous layer and extracted twice more in a similar manner with 1600 milliliters of acetone, 2400 milliliters of water and two grams of solid sodium chloride. The hexane layer was discarded, while the aqueous acetone layers were combined, washed once with hexane, and the hexane layer then discarded. After distillation of the combined aqueous acetone layers to remove the acetone, the aqueous solution was combined with that previously set aside. The combined solutions were then further extracted and purified by known methods to which reference has already been made. There was obtained 152 units of active material per kilogram of gland as determined by the work test.

When reference is made herein to "fat ordinarily intimately associated with a mammalian adrenal gland," this is intended as descriptive of fat which, during the life of the animal or upon dissection thereof, is intimately associated with the gland either internally or externally thereof. This fat may, of course, be treated in separate steps to recover adrenal cortex hormones therefrom, or the recovery may be an integral part of a process for the recovery of hormones from the adrenal glands per se. This will immediately be obvious to any investigator skilled in the hormone extraction art.

Various other modifications may be made without departing from the spirit or scope of the invention, and it is to be understood that we limit ourselves only as defined in the appended claims.

We claim:

1. In a method for the separation of adrenal cortex hormones from adrenal glands and the fat ordinarily intimately associated therewith, the steps of: (1) extracting adrenal glands with an aqueous organic solvent mixture selected from the group consisting of aqueous water-soluble ketones and aqueous water-soluble alcohols; (2) removing superfluous gland from the extract; (3) substantially completely removing the organic solvent from the aqueous solution by distillation; (4) separating the aqueous mixture into a fat layer A and an aqueous layer B; (5) dissolving the fat layer A in a solvent selected from the group consisting of aliphatic and cycloaliphatic hydrocarbons containing from five to eight carbon atoms, inclusive; (6) extracting the adrenal cortex hormones from the fat solution of step (5) with a solvent selected from the group consisting of aqueous water-soluble ketones and alcohols; (7) separating the hydrocarbon layer from the aqueous organic layer of step (6); (8) substantially completely removing the organic solvent from the aqueous organic layer of step (7); and (9) extracting and purifying the adrenal cortex hormones contained in the aqueous layer B and the aqueous extract from step (8) according to conventional procedure.

2. In a method for the separation of adrenal cortex hormones from adrenal glands and the fat ordinarily intimately associated therewith, the steps of: (1) extracting adrenal glands with an aqueous organic solvent mixture selected from the group consisting of aqueous water-soluble ketones and aqueous water-soluble alcohols; (2) removing superfluous gland from the extract; (3) substantially completely removing the organic solvent from the aqueous solution by distillation; (4) separating the aqueous mixture into a fat layer A and an aqueous layer B; (5) dissolving the fat layer A in a solvent selected from the group consisting of aliphatic and cycloaliphatic hydrocarbons containing from five to eight carbon atoms, inclusive; (6) extracting the adrenal cortex hormones from the fat solution of step (5) with a solvent selected from the group consisting of aqueous water-soluble ketones and alcohols by addition of the solvent and dilution of the homogeneous fat solution with water; (7) separating the hydrocarbon layer from the aqueous organic layer of step (6); (8) substantially completely removing the organic solvent from the aqueous organic layer of step (7) by distillation; (9) combining the aqueous extract from step (8) with aqueous extract B; and extracting and purifying the adrenal cortex hormones contained in the combined aqueous extracts according to conventional procedure.

3. In a method for the separation of adrenal cortex hormones from adrenal glands and the fat ordinarily intimately associated therewith, the steps of: (1) extracting adrenal glands with an aqueous organic solvent mixture selected from the group consisting of aqueous water-soluble ketones and aqueous water-soluble alcohols; (2) removing superfluous gland from the extract; (3) substantially completely removing the organic solvent from the aqueous solution by distillation; (4) separating the aqueous mixture into a fat layer A and an aqueous layer B; (5) dissolving the fat layer A in a solvent selected from the group consisting of aliphatic and cycloaliphatic hydrocarbons containing from five to eight carbon atoms, inclusive; (6) extracting the adrenal cortex hormones from the fat solution of step (5) with an aqueous water-soluble ketone by addition of the solvent and dilution of the homogeneous fat solution with water; (7) separating the hydrocarbon layer from the aqueous organic layer of step (6); (8) substantially completely removing the organic solvent from the aqueous organic layer of step (7); and (9) extracting and purifying the adrenal cortex hormones contained in the aqueous layer B and the aqueous layer from step (8) according to conventional procedure.

4. The method according to claim 3, wherein the aqueous water-soluble ketone solution of step (6) is diluted to an aqueous water-soluble ketone solution containing above about twenty per cent by volume of the ketone.

5. The method according to claim 3, wherein the aqueous water-soluble ketone solution of step (6) is diluted to an aqueous water-soluble ketone solution containing from about twenty to sixty per cent by volume of the ketone.

6. The method according to claim 3, wherein the water soluble ketone of step (6) is acetone.

7. The method according to claim 3, wherein the water-soluble ketone of step (6) is acetone, and the acetone solution is diluted to an acetone solution containing about forty per cent by volume of acetone.

8. The method according to claim 3, wherein the aliphatic hydrocarbon solvent of step (5) is an alipatic hydrocarbon boiling between about 30 and 130 degrees centigrade.

9. The method according to claim 3, wherein the aliphatic hydrocarbon solvent of step (5) is an aliphatic hydrocarbon boiling between about 60 and 90 degrees centigrade.

10. The method of claim 3, wherein the adrenal glands extracted are hog adrenal glands.

11. In a method for the separation of adrenal cortex hormones from adrenal glands and the fat ordinarily intimately associated therewith, the steps of: (1) extracting adrenal glands with an aqueous organic solvent mixture selected from the group consisting of aqueous water-soluble ketones and aqueous water-soluble alcohols; (2) removing superfluous gland from the extract; (3) substantially completely removing the organic solvent from the aqueous solution by distillation; (4) separating the aqueous mixture into a fat layer A and an aqueous layer B; (5) extracting the aqueous layer B with an aliphatic hydrocarbon solvent containing from five to eight carbon atoms, inclusive; (6) separating the mixture from step (5) into a hydrocarbon layer $B_1$ and an aqueous layer $B_2$; (7) dissolving the fat layer A in an aliphatic hydrocarbon solvent containing from five to eight carbon atoms, inclusive; (8) combining the hydrocarbon layer $B_1$ with the hydrocarbon fat solution from step (7); (9) extracting the adrenal cortex hormones from the combined fat solutions of step (8) with an aqueous water-soluble ketone by addition of the solvent and dilution of the homogeneous fat solution with water; (10) separating the hydrocarbon layer from the aqueous organic layer of step (9); (11) substantially completely removing the water-soluble ketone from the aqueous organic layer of step (10) by distillation; (12) combining the aqueous extract from step (11) with aqueous extract $B_2$; and (13) extracting and purifying the adrenal cortex hormones contained in the combined aqueous extracts according to conventional procedure.

12. In a method for the separation of adrenal cortex hormones from adrenal glands and the fat ordinarily intimately associated therewith, the steps of: (1) extracting adrenal glands with an aqueous organic solvent mixture selected from the group consisting of aqueous water-soluble ketones and aqueous water-soluble alcohols; (2) removing superfluous gland from the extract; (3) substantially completely removing the organic solvent from the aqueous solution by distillation; (4) separating the aqueous mixture into a fat layer A and an aqueous layer B; (5) extracting the aqueous layer B with an aliphatic hydrocarbon solvent containing from five to eight carbon atoms, inclusive; (6) separating the mixture from step (5) into a hydrocarbon layer $B_1$ and an aqueous layer $B_2$; (7) dissolving the fat layer A in the hydrocarbon layer $B_1$; (8) extracting the adrenal cortex hormones from the fat solution of step (7) with an aqueous water-soluble ketone by addition of the solvent and dilution of the homogeneous fat solution with water; (9) separating the hydrocarbon layer from the aqueous organic layer of step (8); (10) substantially completely removing the water-soluble ketone from the aqueous organic layer of step (9) by distillation; (11) combining the aqueous extract from step (10) with aqueous extract $B_2$; and (12) extracting and purifying the adrenal cortex hormones contained in the combined aqueous extracts according to conventional procedure.

13. In a method for the separation of adrenal cortex hormones from adrenal glands and the fat ordinarily intimately associated therewith, the steps of: (1) extracting the adrenal glands with an aqueous organic solvent mixture selected from the group consisting of aqueous water-soluble ketones and aqueous water-soluble alcohols; (2) removing superfluous gland from the extract; (3) substantially completely removing the organic solvent from the aqueous solution by distillation; (4) separating the aqueous mixture into a fat layer A and an aqueous layer B; (5) extracting the aqueous layer B with an aliphatic hydrocarbon solvent containing from five to eight carbon atoms, inclusive; (6) separating the mixture from step (5) into a hydrocarbon layer $B_1$ and an aqueous layer $B_2$; (7) dissolving the fat layer A in an aliphatic hydrocarbon solvent containing from five to eight carbon atoms, inclusive; (8) combining the hydrocarbon layer $B_1$ with the hydrocarbon fat solution from step (7); (9) extracting the adrenal cortex hormones from the combined fat solutions of step (8) with an aqueous water-soluble ketone by addition of the solvent and dilution of the homogeneous fat solution with water; (10) separating the hydrocarbon layer from the aqueous organic layer of step (9); (11) washing the aqueous organic layer with fresh aliphatic hydrocarbon; (12) removing the hydrocarbon from the aqueous organic layer of step (11); (13) substantially completely removing the organic solvent from the aqueous organic layer; (14) combining the aqueous extract from step (13) with aqueous extract $B_2$; and (15) extracting and purifying the adrenal cortex hormones contained in the combined aqueous extracts according to conventional procedure.

14. In a method for the separation of adrenal cortex hormones from adrenal glands and the fat ordinarily intimately associated therewith, the steps of: (1) extracting adrenal glands with an aqueous organic solvent mixture selected from the group consisting of aqueous water-soluble ketones and aqueous water-soluble alcohols; (2) removing superfluous gland from the extract; (3) substantially completely removing the organic solvent from the aqueous solution by distillation; (4) separating the aqueous mixture into a fat layer A and an aqueous layer B; (5) extracting the aqueous layer B with an aliphatic hydrocarbon solvent containing from five to eight carbon atoms, inclusive; (6) separating the mixture from step (5) into a hydrocarbon layer $B_1$ and an aqueous layer $B_2$; (7) dissolving the fat layer A in the hydrocarbon layer $B_1$; (8) extracting the adrenal cortex hormones from the fat solution of step (7) with an aqueous water-soluble ketone by addition of the solvent and dilution of the homogeneous fat solution with water; (9) separating the hydrocarbon layer from the aqueous organic layer of step (8); (10) washing the aqueous organic layer with fresh aliphatic hydrocarbon; (11) removing the hydrocarbon from the aqueous organic layer of step (10); (12) substantially completely removing the organic solvent from the aqueous organic layer of step (11); (13) combining the aqueous extract from step (12) with aqueous extract $B_2$; and (14) extracting and purifying the adrenal cortex hormones contained in the combined aqueous extracts according to conventional procedure.

15. In a method for the separation of adrenal cortex hormones from the adrenal glands and the fat ordinarily intimately associated therewith, the steps of: (1) extracting adrenal glands with an aqueous organic solvent mixture selected from the group consisting of aqueous water-soluble ketones and aqueous water-soluble alcohols; (2) removing superfluous gland from the extract; (3) substantially completely removing the organic solvent from the aqueous solution by distillation; (4) separating the aqueous mixture into a fat layer A and an aqueous layer B; (5) extracting the aqueous layer B with hexane; (6) separating the mixture from step (5) into a hexane layer $B_1$ and an aqueous layer $B_2$; (7) dissolving the fat layer A in the hexane layer $B_1$; (8) extracting the adrenal cortex hormones from the fat solution of step (7) a plurality of times with an aqueous water-soluble ketone by addition of the solvent and dilution of the homogeneous fat solution with water; (9) separating the hexane layer a plurality of times from the aqueous organic layer of step (8); (10) combining the aqueous organic layers from step (9); (11) washing the combined aqueous organic layers with fresh hexane; (12) removing the hexane from the aqueous organic layer of step (11); (13) substantially completely removing the organic solvent from the aqueous organic layer; (14) combining the aqueous extract from step (13) with aqueous extract $B_2$; and (15) extracting and purifying the adrenal cortex hormones contained in the combined aqueous extracts according to conventional procedure.

16. In a method for the separation of adrenal cortex hormones from adrenal glands and the fat ordinarily intimately associated therewith, the steps of: (1) extracting adrenal glands with an aqueous organic solvent mixture selected from the group consisting of aqueous water-soluble ketones and aqueous water-soluble alcohols; (2) removing superfluous gland from the extract; (3) substantially completely removing the organic solvent from the aqueous solution by distillation; (4) separating the aqueous mixture into a fat layer A and an aqueous layer B; (5) extracting the aqueous layer B with hexane; (6) separating the mixture from step (5) into a hexane layer $B_1$ and an aqueous layer $B_2$; (7) adding a preservative to the aqueous layer $B_2$; (8) dissolving the fat layer A in the hexane layer $B_1$; (9) extracting the adrenal cortex hormones from the fat solution of step (8) a plurality of times with an aqueous water-soluble ketone by addition of the solvent and dilution of the homogeneous fat solution with water; (10) separating the hexane layer a plurality of times from the aqueous organic layer of step (9); (11) combining the aqueous organic layers from step (10); (12) washing the combined aqueous organic layers with fresh hexane; (13) removing the hexane from the aqueous organic layer of step (12); (14) substantially completely removing the organic solvent from the aqueous organic layer; (15) combining the aqueous extract from step (14) with aqueous extract $B_2$; and (16) extracting and purifying the adrenal cortex hormones contained in the combined aqueous extracts according to conventional procedure.

17. In a method for the separation of adrenal cortex hormones from hog adrenal glands and the fat ordinarily intimately associated therewith, the steps of: (1) extracting hog adrenal glands with an aqueous organic solvent mixture selected from the group consisting of aqueous water-soluble ketones and aqueous water-soluble alcohols; (2) removing superfluous gland from the extract; (3) substantially completely removing the organic solvent from the aqueous solution by distillation; (4) separating the aqueous mixture into a fat layer A and an aqueous layer B; (5) dissolving the fat layer A in a solvent selected from the group consisting of aliphatic and cycloaliphatic hydrocarbons containing from five to eight carbon atoms, inclusive; (6) extracting the adrenal cortex hormones from the fat solution of step (5) with a solvent selected from the group consisting of aqueous water-soluble ketones and alcohols; (7) separating the hydrocarbon layer from the aqueous layer of step (6); (8) substantially completely removing the organic solvent from the aqueous organic layer of step (7); and (9) extracting and purifying the adrenal cortex hormones contained in the aqueous layer B and the aqueous extract from step (8) according to conventional procedure.

18. In a method for the separation of adrenal cortex hormones from adrenal glands and the fat ordinarily intimately associated therewith, the steps of: (1) extracting adrenal glands with an aqueous organic solvent mixture selected from the group consisting of aqueous water-soluble ketones and aqueous water-soluble alcohols; (2) removing superfluous gland from the extract; (3) substantially completely removing the organic solvent from the aqueous solution by distillation; (4) separating the aqueous mixture into a fat layer A and an aqueous layer B; (5) dissolving the fat layer A in a solvent selected from the group consisting of aliphatic and cycloaliphatic hydrocarbons containing from five to eight carbon atoms, inclusive; (6) extracting the adrenal cortex hormones from the fat solution of step (5) with a solvent selected from the group consisting of aqueous water-soluble ketones and alcohols; (7) separating the hydrocarbon layer from the aqueous organic layer of step (6); (8) substantially completely removing the organic solvent from the aqueous organic layer of step (7) by distillation; (9) combining the aqueous extract from step (8) with aqueous extract B; and (10) extracting and purifying the adrenal cortex hormones contained in the combined aqueous extracts according to conventional procedure.

19. In a method for the separation of adrenal cortex hormones from adrenal glands and the fat ordinarily intimately associated therewith, the steps of: (1) extracting adrenal glands with an aqueous organic solvent mixture selected from the group consisting of aqueous water-soluble ketones and aqueous water-soluble alcohols; (2) removing superfluous gland from the extract; (3) substantially completely removing the organic solvent from the aqueous solution by distillation; (4) separating the aqueous mixture into a fat layer A and an aqueous layer B; (5) dissolving the fat layer A in a solvent selected from the group consisting of aliphatic and cycloaliphatic hydrocarbons containing from five to eight carbon atoms, inclusive; (6) extracting the adrenal cortex hormones from the fat solution of step (5) with an aqueous water-soluble ketone; (7) separating the hydrocarbon layer from the aqueous organic layer of step (6); (8) substantially completely removing the organic layer from the aqueous organic layer of step (7); and (9) extracting and purifying the adrenal cortex hormones contained in the aqueous layer B and the aqueous layer from step (8) according to conventional procedure.

20. The process of claim 19, wherein the aqueous water-soluble ketone of step (6) is aqueous acetone.

WILLIAM J. HAINES.
RICHARD H. JOHNSON.

REFERENCES CITED

The following references are of record in the file of this patent:

UNITED STATES PATENTS

| Number | Name | Date |
| --- | --- | --- |
| 2,074,492 | Swingle | Mar. 23, 1937 |

FOREIGN PATENTS

| Number | Country | Date |
| --- | --- | --- |
| 545,267 | Germany | Feb. 27, 1932 |

OTHER REFERENCES

Science, Mar. 21, 1930, pages 321, 322.

Kuizenga in J. Biol. Chem., vol. 147, Mar. 1943, pages 561–565. Copies of above publ. in Pat. Off. Library.